United States Patent

Sasin et al.

[19]

[11] Patent Number: 5,875,397
[45] Date of Patent: Feb. 23, 1999

[54] COMMUNICATIONS SYSTEM AND METHOD FOR TESTING OF A COMMUNICATIONS APPARATUS

[75] Inventors: Tiberius Sasin; Steffen Hermanns, both of Aachen, Germany

[73] Assignee: Telefonaktiebolaget LM Ericsson, Stockholm, Sweden

[21] Appl. No.: 987,616

[22] Filed: Dec. 9, 1997

[30] Foreign Application Priority Data

Dec. 10, 1996 [DE] Germany .................. 196 51 244.1

[51] Int. Cl.$^6$ .................................. H04B 17/00
[52] U.S. Cl. ................ 455/423; 455/67.1; 455/67.4; 379/1; 375/224; 370/241
[58] Field of Search ....................... 455/403, 423, 455/424, 425, 500, 507, 517, 524, 67.1, 67.4, 67.7, 88, 550, 557, 561, 564, 575, 115, 226.1, 416, 556; 379/21, 1; 375/213, 224; 370/241, 252, 260; 371/20.1–20.2, 20.4, 20.5

[56] References Cited

U.S. PATENT DOCUMENTS

| 4,707,849 | 11/1987 | Rault et al. . |
| 4,927,789 | 5/1990 | Shirley, Jr. et al. . |
| 5,481,588 | 1/1996 | Rickii et al. ................ 455/423 |
| 5,504,800 | 4/1996 | Yehushua et al. ............ 379/1 |

FOREIGN PATENT DOCUMENTS

| 0 353 759 A2 | 2/1990 | European Pat. Off. . |
| 0 418 853 A2 | 3/1991 | European Pat. Off. . |
| 0 539 750 A2 | 10/1992 | European Pat. Off. . |
| 0 689 306 A2 | 12/1995 | European Pat. Off. . |
| 0 734 191 A1 | 9/1996 | European Pat. Off. . |
| 3211967 A1 | 10/1983 | Germany . |
| 3212006 C2 | 1/1984 | Germany . |
| 3240660 A1 | 5/1984 | Germany . |
| 3428921 A1 | 2/1986 | Germany . |
| 3502564 A1 | 7/1986 | Germany . |
| 3706406 A1 | 9/1988 | Germany . |
| 3743959 A1 | 7/1989 | Germany . |
| 3907237 A1 | 9/1990 | Germany . |
| 4124617 A1 | 1/1993 | Germany . |
| 4136817 A1 | 5/1993 | Germany . |
| 4205239 A1 | 8/1993 | Germany . |
| 4233222 A1 | 4/1994 | Germany . |
| 43333391 C1 | 2/1995 | Germany . |
| 4340968 C1 | 2/1995 | Germany . |
| 4330705 A1 | 3/1995 | Germany . |
| 44438650 A1 | 5/1995 | Germany . |
| 4311910 C2 | 8/1995 | Germany . |
| 19529156 A1 | 2/1996 | Germany . |
| 4442613 A1 | 6/1996 | Germany . |
| 19517393 C1 | 10/1996 | Germany . |
| WO 92/03003 | 2/1992 | WIPO . |
| WO 94/00932 | 1/1994 | WIPO . |

*Primary Examiner*—Doris H. To
*Attorney, Agent, or Firm*—Burns, Doane, Swecker & Mathis, L.L.P.

[57] ABSTRACT

The present invention concerns a communications system including a communications apparatus (KV) and a test apparatus for testing of the communications apparatus, as well as a method for testing of a communications apparatus (KV). The communications apparatus includes a plurality of telephones ($T_1$ to $T_n$) and at least a transmission station (UEV) for transmitting signals. The test apparatus includes a central signal processing apparatus (ZV) with at least a programmable data processing apparatus (S) for the generation of digital test signals for testing of the telephone communications apparatus (KV) and a converter apparatus (WV) connected with the programmable data processing apparatus (S). The converter apparatus (WV) is constructed so that it converts the digital test signals of the data processing apparatus (S) under the control of telephone specific configuration data into operating signals for controlling the operation of the keypad and of the microphone of the telephone ($T_n$) via a connection apparatus (AV) and further so that it converts answer signals received from the loudspeaker and from the calling apparatus of the telephone ($T_n$) into digital operating answer signals and transfers them to the programmable data processing apparatus (S), where they are saved or evaluated.

24 Claims, 10 Drawing Sheets

COMMUNICATIONS SYSTEM AND METHOD FOR TESTING OF A COMMUNICATIONS APPARATUS

BACKGROUND OF THE INVENTION

The present invention concerns a communications system consisting of a communications apparatus and of a test apparatus for testing of the communications apparatus, as well as a method for testing of a communications apparatus.

Telephone communications apparatuses can be built up with permanently connected telephones or with mobile telephones or a combination of the two.

The basic constituent parts of a mobile telephone communications apparatus are mobile telephones and base apparatuses having transmission stations. Thus, the mobile telephones which are in operation stay in connection with a respective one of the transmission stations via radio signals. Between the transmission stations themselves or also permanent line connections can be provided. Such a communications apparatus normally also has interfaces to change for example permanent communications apparatuses with which telephones are connected via fixed lines.

Dialing a call number from a mobile telephone will create a connection from the mobile telephone to the nearest lying transmission station, which for its part establishes the connection to the desired subscriber either via other transmission stations or via an interface to another communications system.

In order to make sure that a mobile telephone can always make a connection to a transmission station, the transmission stations must be so arranged that their catchment areas cover an area completely. It must further be ensured that a call is not interrupted if one of the participating mobile telephones moves out of the catchment area of a transmission station (also known as a cell). For these cases, handover procedures are provided in order to hand a call connection from the transmission station of a first cell to a mobile telephone to the transmission station of a second cell, if a mobile telephone moves from the first to the second cell.

Furthermore, the mobility of the user causes requests to come through that, unlike in a permanent network, in which a call can simply be directed to another permanent user network address, in a mobile telephone network, the place of a called mobile telephone must be established (paging) before initiation of a call and that, depending on a location of the mobile telephone in relation to a transmission station and depending on the geography (city, countryside), otherwise strong signals are weakened.

Moreover, customer service facilities, like for example, conference switching, voicemail services, data transmission, etc., must be provided in a mobile telephone communications system, which must be partially able to be activated by the respective telephones.

A mobile telephone communications apparatus is therefore a complex system, which is usually established and operated by an interaction of hardware and software components.

Standardized guidelines for a mobile communications system are laid down for example in the Global System for Mobile Communications (GSM). GSM specifies the features of a network, like, for example, the communications protocol between mobile telephones and transmission stations, the handover of a call between transmission stations, the requirements of a mobile telephone of a customer of a network operator in the network of another operator, speech and data services, connections to available networks, to ISDN-services and a range of other user service provisions.

The complexity of a mobile telephone communications system demands the possibility of specific testing of individual components or of the complete system. Extensive tests are carried out for localizing software and hardware faults appearing in the system during operation, prior to the release of the system and prior to the release of a further development of the system. In the prior art, a range of different test strategies have been developed, in order to carry out the testing of communications systems effectively. One of these test methods is the so-called "black box testing" in which the operation of the system in reaction to a defined interference in the system is analysed, without making any reference to the internal construction of the system.

DE 3 211 967 describes a switching arrangement for an apparatus with which different operating and test sequences are effected in a telephone exchange system or in an apparatus connected thereto, and an unusual pattern is displayed, whereby these processes are executed by a control calculation unit belonging to the system on the basis of information which is selectively transmitted to it by means of a corresponding operation of a key assigned to an input unit and this execution results from access to storage units which is thereby effected, in which storage units the necessary execution functions are contained as corresponding command sequences, especially for a unit used for traffic simulation in telephone networks and provided with the corresponding subscriber simulations. Functions typical for the system, like for example line occupation, dialing, calling and speech can be simulated by means of the subscriber simulations. According to the provisions of a predetermined test program of a program-controlled test unit, specific tone pitches generated by a transmitter are applied to the subscriber simulations. Monitoring takes place by evaluating the transmitted audible tones, the call current and, if necessary, dialing pulses.

The subscriber simulations of DE 32 119 67 have the disadvantage that no features corresponding to a real telephone can be incorporated into the test processes. Thus, a communications system cannot be tested with the inclusion of features of various telephones, for example of a variety of manufacturers.

When testing a communications network with mobile telephones, the features of the mobile telephones can have an important effect on the test conditions.

SUMMARY OF THE INVENTION

It is therefore an object of the present invention to provide a communications system with a communications apparatus and an apparatus for the automatic operation of telephones for user simulation, whereby the communications system is tested under operational load conditions.

According to one aspect, the invention provides a communications system, comprising a telephone communications apparatus that contains a plurality of telephones, particularly mobile telephones, and at least one transmission station for transmitting signals in said telephone communications apparatus; a test apparatus for testing said telephone communications apparatus in an operational load condition, whereby the telephones are connectable to the test apparatus, comprising a central signal processing apparatus having at least one programmable data processing apparatus for the generation of digital test signals for testing said telephone communication apparatus under the control of test instructions; and a converter apparatus connected to said programmable data processing apparatus, which is so adapted that it converts the digital test signals of the data processing apparatus under the control of telephone specific configuration data, which comprise data for adapting the converter apparatus to the telephone employed, into operating signals for controlling the operation of the keypad and of the microphone of the telephone; and it converts answer signals received from the loudspeaker and from the calling apparatus of the telephone into digital operating answer signals and transfers them to the programmable data processing apparatus, where they are saved; and a connection apparatus, by means of which the converter apparatus is connected with the telephone and by means of which the operating signals from the converter apparatus are transmitted to the selected telephone and answer signals are transmitted from the selected telephone or telephones to the converter apparatus.

According to another aspect, the invention provides a method of testing, under operational load conditions, a telephone communications apparatus which contains a plurality of telephones, particularly mobile telephones, and at least one transmission station for transmitting signals in said telephone communications apparatus, comprising: generating digital test instructions in a programmable data processing apparatus of a central signal processing apparatus controlled by means of test instructions for testing the telephone communications apparatus; transmitting the digital test signals to a converter apparatus and converting the digital test signals, by use of telephone-specific configuration data, into operating signals for the operational control of the keypad and microphone of the telephone; and converting answer signals received from the loudspeaker and from the calling apparatus of the telephones into digital operating answer signals and transferring the digital operating answer signals to the programmable data processing apparatus and recording the operating answer signals.

According to the invention, mobile telephones or permanently connected telephones of various suppliers can be automatically operated and monitored via an interface, and their behavior can be simulated by control of the keypad and the microphone and by tapping into the calling apparatus and the loudspeaker of the telephone of a subscriber. According to the invention, for example, certain subscriber service provisions can also be automatically activated and in addition, by means of hardware components, the movement of subscribers and the handover of calls between two transmission stations can also be simulated. An operational load condition can, for example, be generated by a load generator, which simulates a plurality of calls. Thus a pre-specified network load is generated by the load generator during the test.

By the use of modified conventional telephones it is possible to test a communications system depending on the type of the communications apparatus (GSM, etc.). Thus the test system can be brought into conformity with a variety of different types of telephones with telephone-specific configuration data, which can be saved in a memory apparatus.

Furthermore, the call set-up and the calls can be monitored so that test signals are transmitted via the voice paths and these transmissions are recorded. Identification signals, which identify respective telephones participating in a call, can be transmitted via the voice paths by means of the test apparatus, controlled by the test instructions. For this purpose, a voice channel is set up between each pair of telephones of a plurality of telephones in a conversation involving two telephones or a conference call involving three or more subscribers. A pattern of tone pulses that clearly identifies a first telephone and with a predetermined frequency is then transmitted via the voice channel from the first telephone. The reception of the tone-pulse pattern transmitted via the voice channel is monitored at a second telephone participating in the call. The transmission of the pattern of tone pulses takes place between the first and the second telephone in the presence of voice compression and voice decompression and the pattern of tone pulses is selected such that it is also possible to identify the first telephone when the pattern of tone pulses is received at the second telephone if voice compression and decompression is applied. The correct switching of connections in the case of two-phone calls or conference calls can be established, registered and evaluated. This further enables long-term testing and comprehensive automatic "black-box" testing.

A further advantage is that hardware components for an interrupt apparatus can also be provided, which are adapted to interrupt a plurality of electrical connections in transmission stations or between transmission stations. Thus the interrupt apparatus can be constructed from a plurality of controlled switches which can be operated from the program-controlled programmable data processing apparatus of the central signal processing apparatus. An individual or a group of electrical connection lines in the transmission station may thus be interrupted for well-defined periods of time. A very high test granularity may be achieved, which means that faults can be precisely localized. The effects of the line interruptions caused by the interrupt apparatus in the transmission station on the operation of the telephone communications apparatus can be established, recorded and/or evaluated and thus a fault can be localized, also automatically without the presence of test personnel at the test apparatus.

According to a further aspect, the interrupt apparatus is arranged between the circuit card or cards and the circuit card mount of the transmission station or on the front sides of the transmission statement circuit cards inserted into the circuit card mount. The interrupt apparatus can also be arranged between various transmission stations. Several interrupt apparatuses can also be arranged in this manner.

According to another aspect, the central signal processing apparatus can be connected via the programmable data processing apparatus, which may be e.g. a commercially available computer, to a plurality of external programmable data processing apparatuses which likewise may be commercially available computers, via a network for data exchange. In this instance, the programmable data processing apparatus of the central signal processing apparatus acts as a server which is connected via a server process to the converter apparatus and which is connected via client processes to a plurality of the external programmable data processing apparatuses or data display stations (clients). Test instructions can therefore be executed with the plurality of these stations, conveying data via client processes to the server of the central signal processing apparatus; this server then generates digital control signals and transmits them as part of a server process to the converter apparatus, which in turn controls the interrupt apparatus within the transmission station or controls and monitors the telephones. This also makes it possible to locate the external data processing apparatuses remotely from the data processing apparatus of the central signal processing apparatus and to connect them therewith via e.g. a local area network (LAN) or via the internet, or via another remote data transmission apparatus. Test instructions therefore do not need to be executed locally, i.e. tests can also be performed over large distances (remote testing) and hence the test apparatus can be utilized more effectively.

BRIEF DESCRIPTION OF THE DRAWINGS

The invention is described in the following in relation to the specific embodiments shown in FIGS. 1 to 11. These show.

The following designations are used in the figures.

KS a communications system,
KV a communications apparatus,
TV a test apparatus,
$UEV_{1-n}$ a transmission station,
S a programmable data processing apparatus of a central signal processing apparatus (server),
WV a converter apparatus,
$T_{1-n}$ a telephone,
$C_{1-n}$ an external programmable data processing apparatus,
DFV a remote data transmission apparatus,
SK a circuit card of the transmission station,
ST a circuit card carrier of the transmission station,
KL a contact strip,
DS a digital control circuit,
AS a conversion circuit,
BS a movement simulation circuit,
AV a connection apparatus,
A an adapter,
RV a call apparatus of a telephone,
LS a loudspeaker of a telephone,
MI a microphone of a telephone,
TT a keypad of a telephone,
REV a call reception apparatus,
LEV a loudspeaker reception apparatus,
MSV a microphone control apparatus,
TSV a keypad control apparatus,
MSC a mobile service switching center,
BSC a base switching center,
BTS a base transceiver station.

DESCRIPTION OF THE INVENTION

Figure 1:
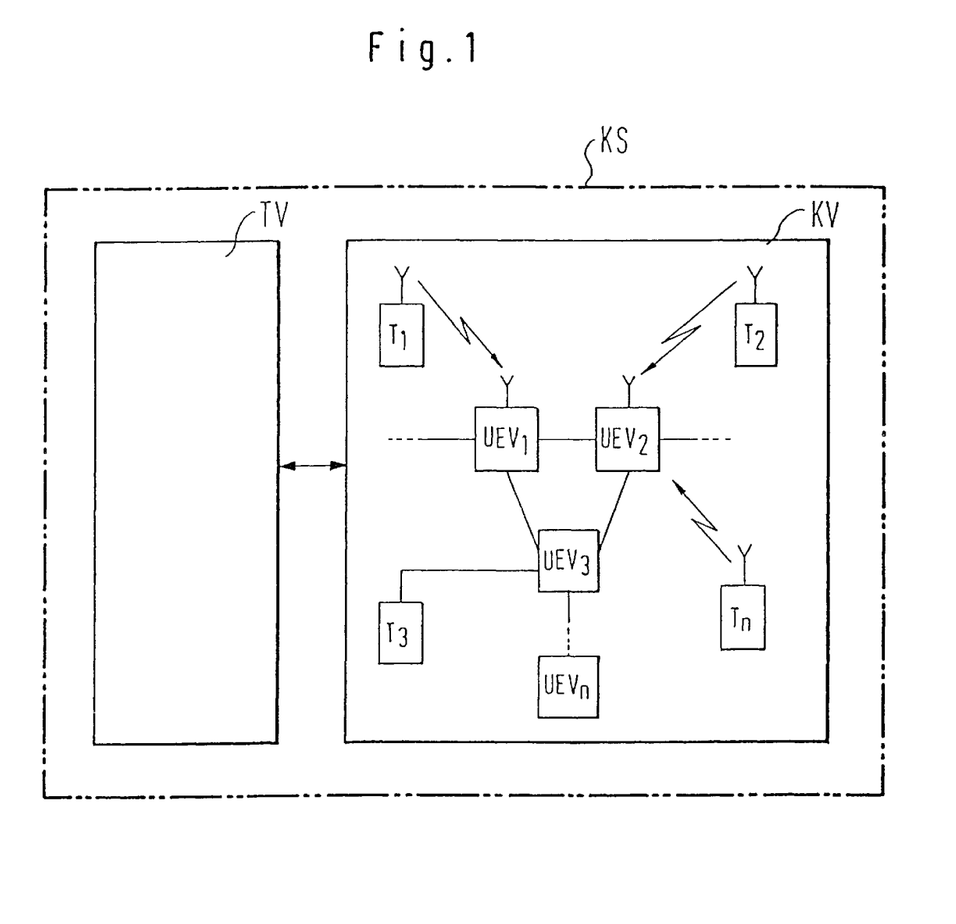
FIGS. 1 and 2 block diagrams of two communications systems.

FIG. 1 shows the general structure of a communications system KS. The communications system KS comprises a communications apparatus KV and a test apparatus TV that are connected together. Selected components of the communications apparatus, telephones $T_1$ to $T_n$ and transmission stations $UEV_1$ to $UEV_n$, are also shown in FIG. 1. $T_1$ and $T_2$ designate mobile telephones, whereas $T_3$ includes a conventional fixed network telephone. Transmission stations $UEV_1$ and $UEV_2$ are also mobile telephone transmission stations which can set up radio communication connections to mobile telephones. Transmission station $UEV_3$ may be a transmission station of another communication network or another apparatus for transmitting data within a communication apparatus according to the present invention. The communication apparatus has to ensure, inter alia, that a called mobile telephone can be localized in the net so that if a mobile telephone moves out of a transmission station's catchment area during a call, the corresponding call can be passed on to another transmission station and certain user services can be activated. For the purposes of data exchange, the communication apparatus is connected to the test apparatus, by means of which test programs (i.e. one or more sequences of test cases with test commands from the test case generator) and/or test instructions, i.e. test commands for testing the communication apparatus, can be generated and executed.

Figure 2:
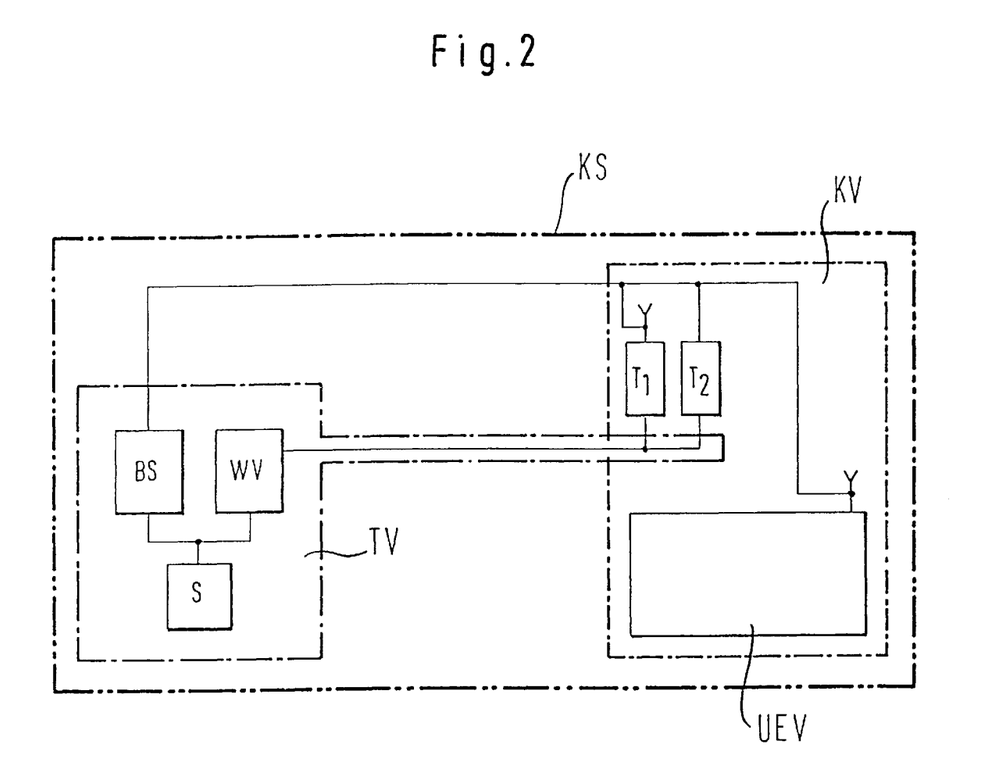

FIG. 2 shows another exemplary embodiment of a communications system according to the present invention. Connection or antenna cables of telephones $T_1$ to $T_n$ and transmission stations $UEV_1$ to $UEV_n$ are connected to a movement simulation circuit BS of the test apparatus, making it possible to simulate or reproduce mobile telephone movements and air paths. The converter apparatus is also connected to telephones $T_1$ to $T_n$ so as to control the telephones on the basis of operating signals and to receive response signals from the telephones. The movement simulation circuit BS and converter apparatus WV are each connected to the programmable data processing apparatus S.

During testing, test instructions are supplied by the programmable data processing apparatus S for operating the interrupt apparatus, as well as test instructions for the mobile telephones' simulated movement between transmission stations. The converter apparatus generates operating signals for operating the telephones' keypads and microphones under the control of digital test signals from the programmable signal processing apparatus S and receives answer signals from the loudspeakers and call apparatuses of the telephones. The answer signals are converted into digital operating answer signals and are transferred to the programmable signal processing apparatus S to be evaluated or recorded.

Attention is drawn to the fact that the connection or antenna cables of the telephones do not have to be connected to the movement simulation circuit BS if no movement simulation is necessary.

Figure 3:
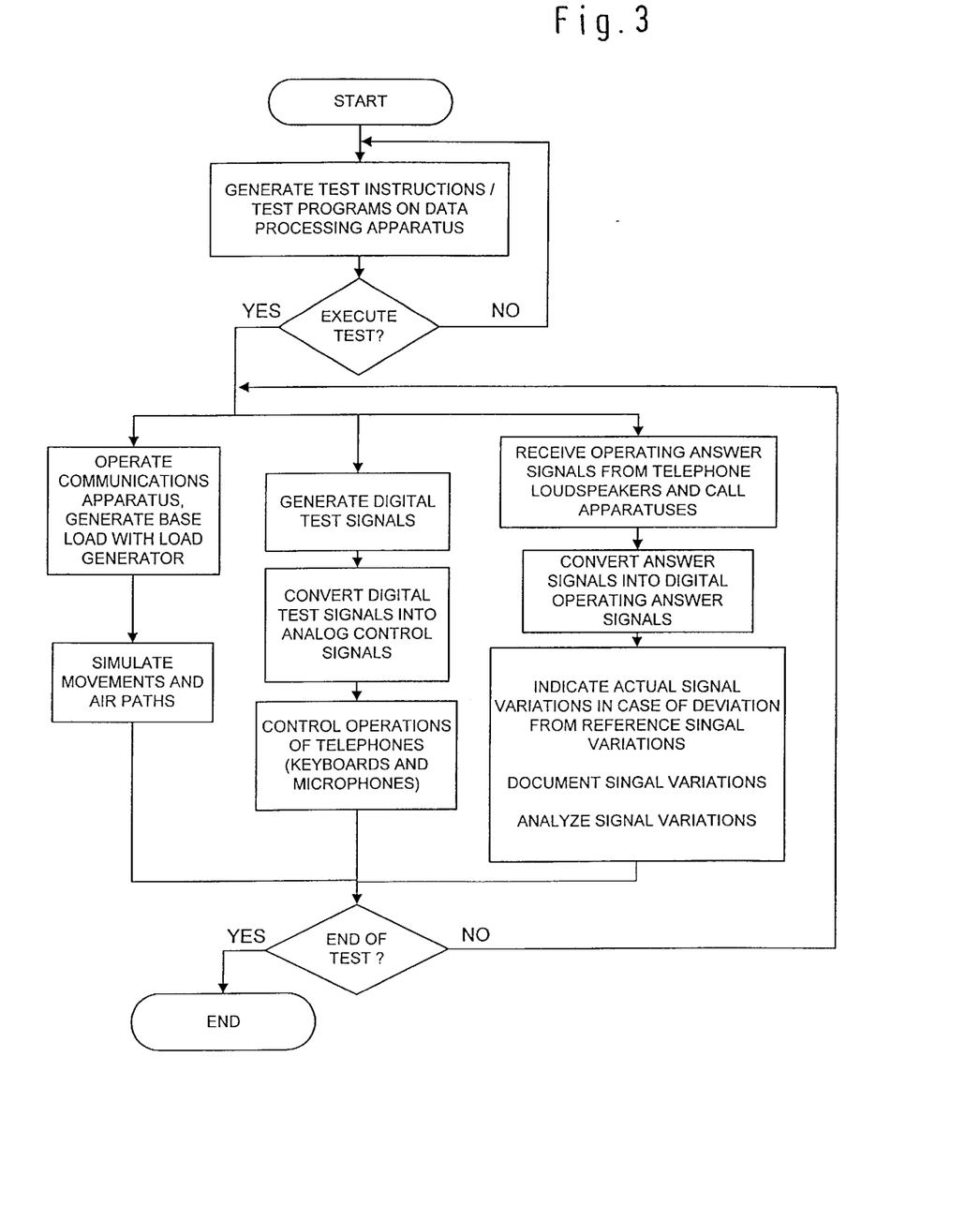
FIG. 3 a flow diagram of a test sequence.

FIG. 3 shows a flow diagram of the operation of the communications system according to FIG. 2. Test programs or test instructions are generated in the programmable data processing apparatus S. If execution of the test programs/test instructions is desired, digital test signals are generated in the programmable data processing apparatus S, which are transferred to the converter apparatus WV. There, they are converted into operating signals to operate the keypad TT and the microphone MI of the telephone. Further digital test signals can be transferred in order to configure the communications apparatus KV, so as to produce a simulation of the movement of the mobile telephone $T_n$ as well as an air path simulation within the movement simulation circuit BS. Furthermore, the loudspeaker LS and call apparatus RV of the telephone $T_n$ are monitored by the converter apparatus WV and answer signals received are converted into digital operating answer signals. A deviation of the answer signals from the expected reference answer signals can be indicated. The digital operating answer signals are transferred to the programmable data processing apparatus S for recording or for evaluation.

Identification signals, which identify the respective telephones participating in a call, can be transmitted over the voice paths of the communications system KV via the test apparatus TV therein. For this purpose, a voice path is set up between each pair of telephones of a plurality of telephones in a call involving two telephones or in a conference call involving three or more subscribers, and a pattern of tone pulses that clearly identifies a first telephone is transmitted from the first telephone via the voice path. The reception of the pattern of tone pulses transmitted via the voice path is monitored at a second telephone participating in the call. The transmission of the pattern of tone pulses between the first and the second telephone takes place in the presence of voice compression and voice decompression, as is usual for example in GSM. The pattern of tone pulses is selected in such a way that it is also possible to identify the first telephone when the pattern of tone pulses is received at the second telephone if voice compression and voice decompression are used.

Figure 4:
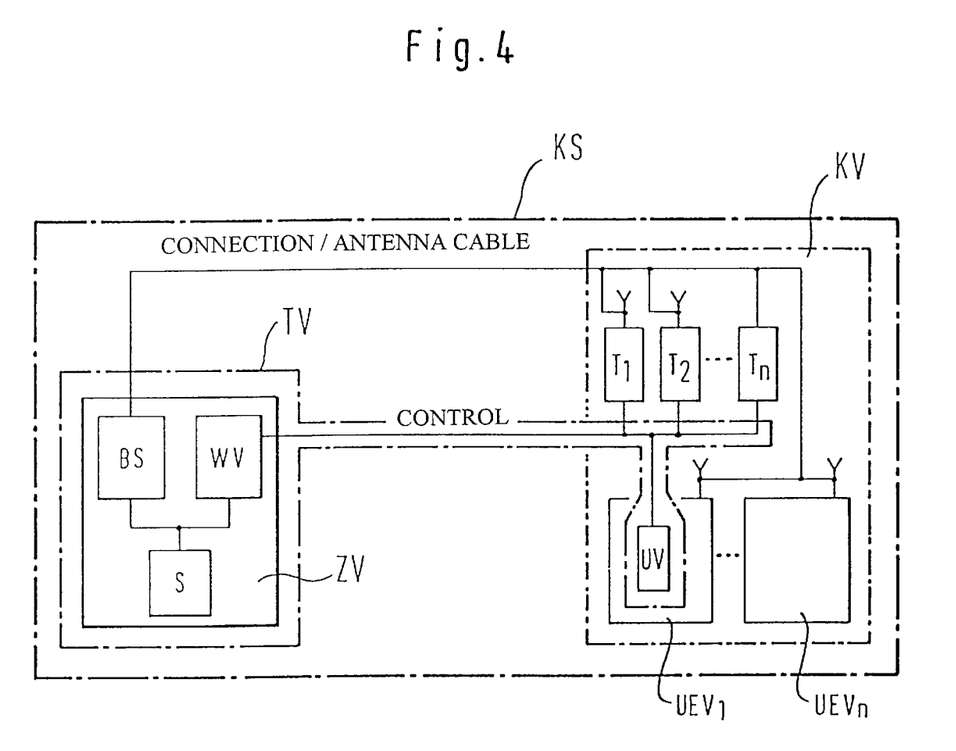
FIG. 4 a block diagram of a further communications system.

FIG. 4 shows a further exemplary embodiment of the communications system KV according to the present invention. In addition to the exemplary embodiment shown in FIG. 2, an interrupt device UV is provided within the transmission station $UEV_1$ in the exemplary embodiment of FIG. 4. Further interrupt devices UW can be provided in the transmission stations $UEV_1$ to $UEV_n$. The transmission station $UEV_1$ is connected with the interrupt device UV like the telephones $T_n$. A plurality of electrical connection lines within the transmission station $UEV_1$ can be interrupted with the interrupt device UV. The interrupt device UV is controlled, like the telephones $T_n$, by means of operating signals from the converter apparatus WV. Individual or several of the electrical connection lines can be interrupted for a period of time determined by the operating signals.

Figure 5:
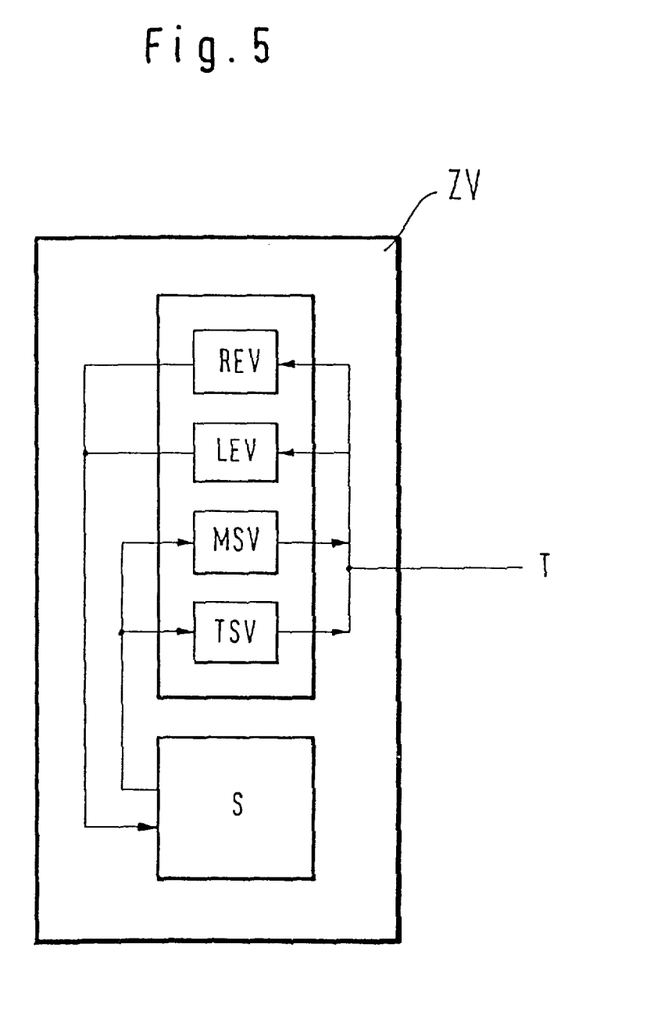
FIG. 5 a block diagram of part of a test apparatus.

FIG. 5 shows a block diagram of the central signal processing apparatus. A converter apparatus WV comprises a microphone control apparatus MSV and a keypad control apparatus TSV, which with the necessary logic and the necessary filters are adapted to control the microphone MI and the keypad TT, respectively, of the telephone T. The converter apparatus WV further comprises a call reception apparatus REV and a loudspeaker reception apparatus LEV, which with the necessary logic and the necessary filters are adapted to receive signals from the calling apparatus RV and the loudspeaker LS of the telephone T. The keypad control apparatus TSV and the microphone control apparatus MSV receive digital test signals from the programmable signal processing apparatus S and convert these into operation signals for operating the telephones $T_n$. Answer signals sent from the telephones $T_n$ are converted in the call reception apparatus REV and in the loudspeaker reception apparatus LEV, respectively, into digital operation answer signals and are transferred to the programmable signal processing apparatus S.

Figure 6:
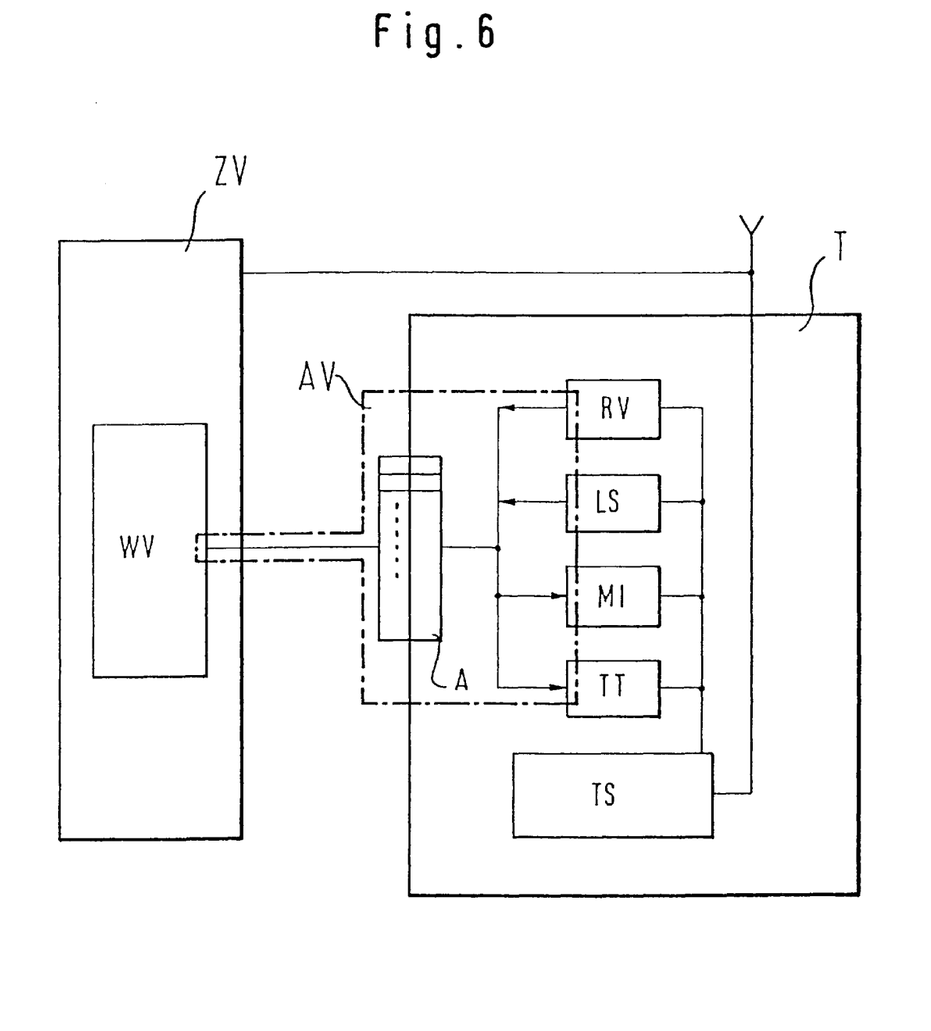
FIG. 6 a block diagram of a connection apparatus.

FIG. 6 shows an exemplary embodiment of a connection apparatus AV for connection of a telephone to the converter apparatus WV. An adapter A on telephone T is connected with the calling apparatus RV, the loudspeaker LS, the microphone MI and the keypad TT of the telephone T. The adapter A can be connected with the converter apparatus via a connection line. The telephone circuit TS can be connected with the central signal processing apparatus ZV via the antenna. At the same time, the telephone circuit TS is connected with the calling apparatus RV, the loudspeaker LS, the microphone MI and the keypad TT in order to control them. In test operation, signals are transmitted from the converter apparatus WV to the keypad TT and to the microphone MI and answering signals are transmitted from the calling apparatus and the loudspeaker to the converter apparatus WV.

Figure 7:
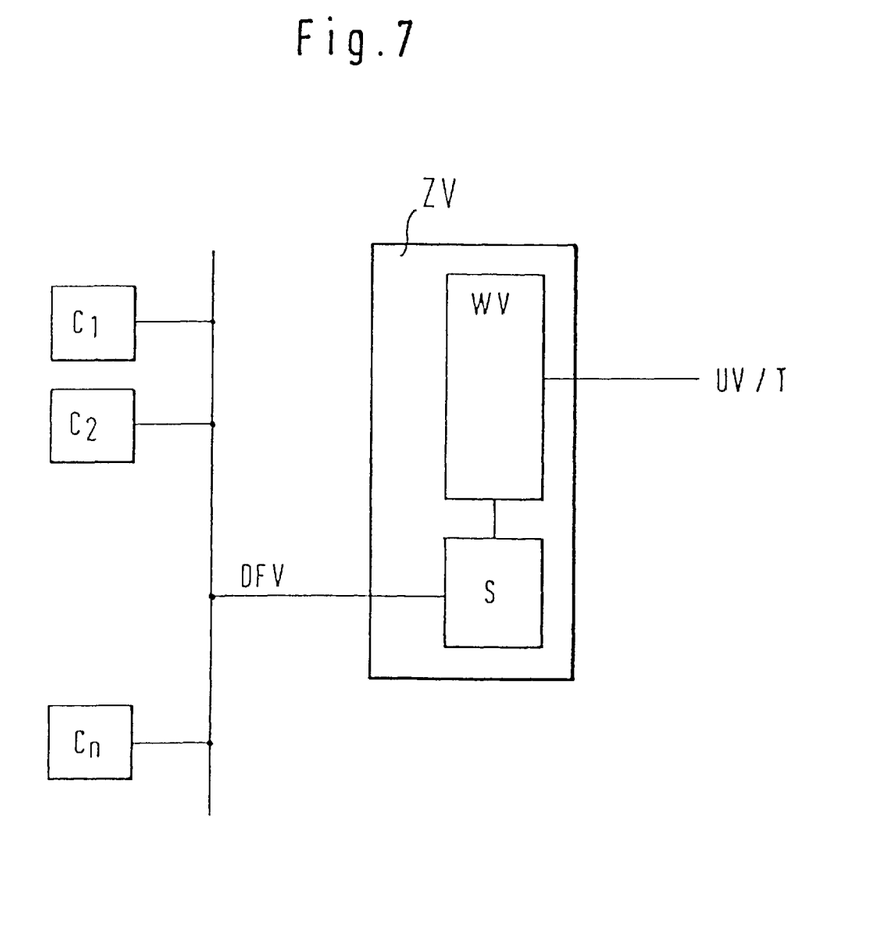
FIG. 7 a block diagram of part of a test apparatus.

FIG. 7 shows a partial view of a test apparatus according to the present invention. A plurality of external data processing apparatuses or data display stations $C_1$ to $C_n$ is connected via a remote data transmission station DFV to the programmable data processing apparatus S. The external programmable data processing apparatuses $C_1$ to $C_n$ are clients, while the programmable data processing apparatus S is a server. In the exemplary embodiment depicted, test instructions or test programs can be generated and/or executed on the external data processing apparatuses.

Figure 8:
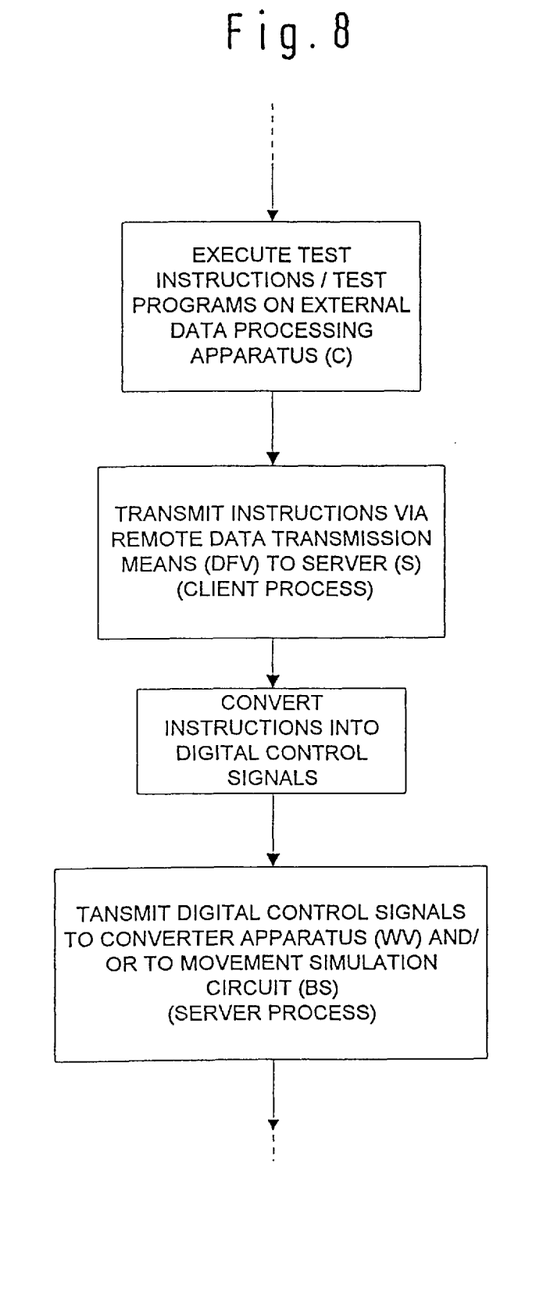
FIG. 8 a flow diagram of part of a test sequence.

FIG. 8 shows a flow diagram of a corresponding test process. Independent test programs or test instructions are executed on one or more of the external data processing apparatuses. The test instructions are transmitted by the external data processing apparatuses via the remote data transmission station DFV to the programmable data processing apparatus S (server) in a "client" process. In accordance with the instructions transmitted in the client process, the server S generates digital control signals that are transmitted to the converter apparatus or to the movement simulation apparatus in a "server" process.

Figure 9:
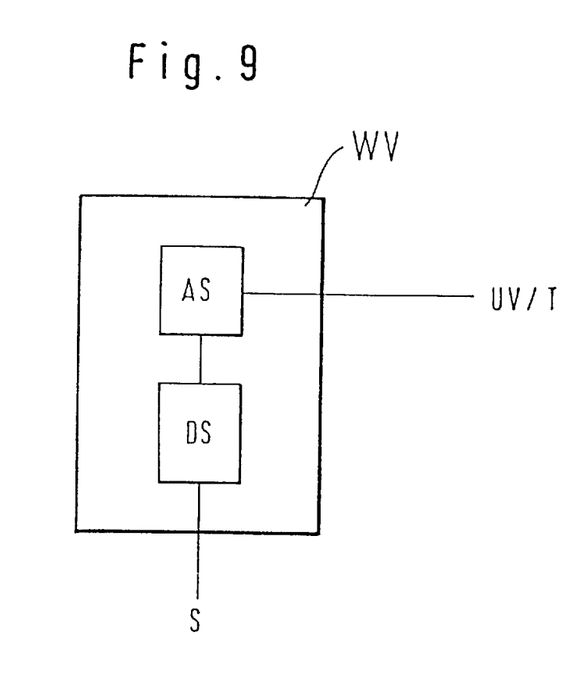
FIG. 9 an example of a converter apparatus.

FIG. 9 shows an exemplary embodiment of a converter apparatus WV. A digital control circuit DS is connected to a conversion circuit AS. The digital control circuit DS is fitted with logic circuits and memories in which special configuration files for telephones etc. are stored for transmission stations UEV in order to adapt converter apparatus WV. The circuit is fitted with logic and filters necessary for generating operating signals. By using the configuration files stored in memory apparatuses of the digital control circuit DS, test instructions received by the programmable data processing apparatus S are converted by the digital control circuit DS into digital control signals which are transmitted to conversion circuit AS. In the conversion circuit, the digital control signals are converted into analog operating signals adapted to the respective target apparatuses (telephones of various manufacturers, various types of transmission station) and which are then transmitted so as to operate interrupt apparatuses UW in transmission stations UEV or are transmitted to selected telephones.

Figure 10:
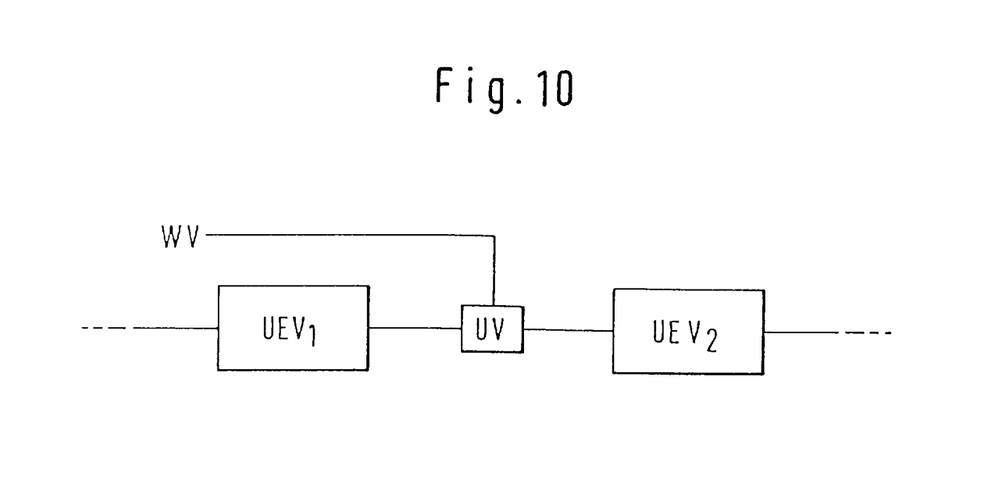
FIG. 10 an example of an arrangement of an interrupt apparatus.

FIG. 10 shows an exemplary embodiment of part of a communications apparatus KV. An interrupt apparatus UV is arranged in such a way that it can interrupt electrical connections between different transmission stations UEV. For this purpose, the interrupt apparatus UV is arranged between two transmission stations UEV. Further interrupt apparatuses UW can also be arranged between further transmission stations UEV.

Figure 11:
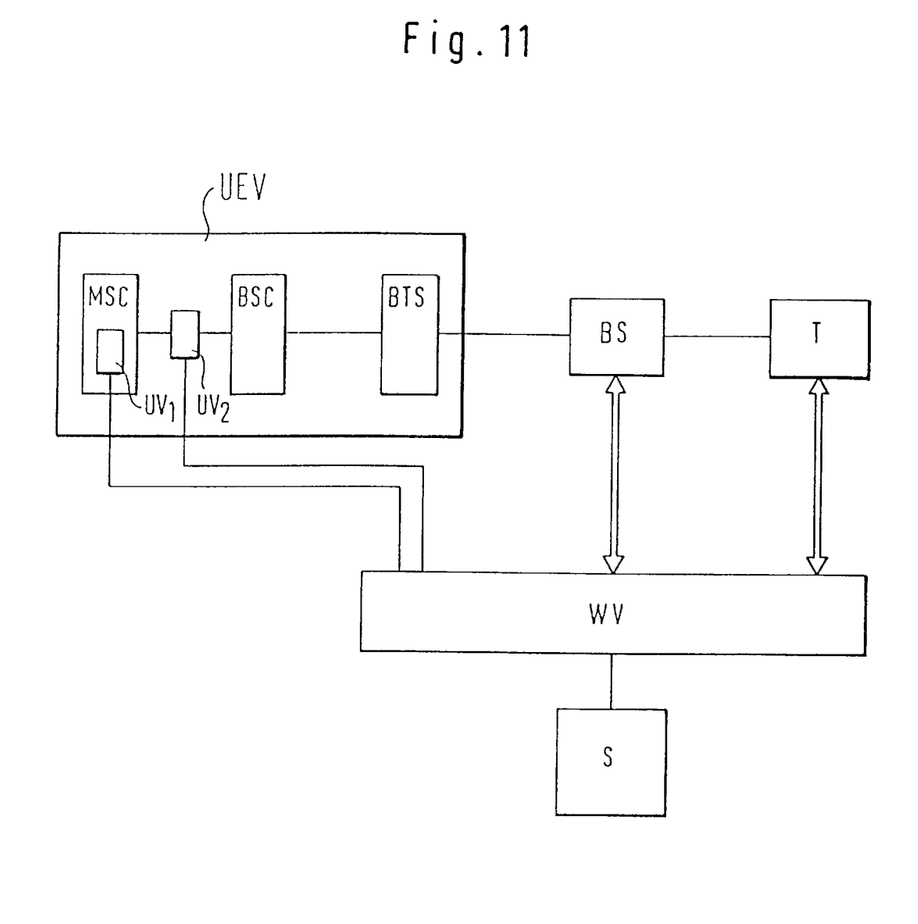
FIG. 11 a block diagram of a further communications system.

FIG. 11 shows a block diagram of another exemplary embodiment of a communications system. The transmission station UEV is a GSM transmission station that contains a mobile services switching center MSC, a base switching center BSC and a base transceiver station BTS for transmitting signals in the communications apparatus KV. A movement simulation circuit BS is connected between a base transceiver station BTS and the mobile telephone T; this BS circuit simulates movements of the mobile telephone T in a manner controlled by the converter apparatus WV. The telephone T and interrupt apparatuses $UV_1$ and $UV_2$ are also connected to the converter apparatus WV so as to be controlled by operating signals from the converter apparatus WV, and to transmit response signals to the converter apparatus WV. The converter apparatus WV is controlled by a programmable data processing apparatus S, as already described on the basis of FIG. 2.

We claim:

1. A communications system, comprising:

a telephone communications apparatus that contains a plurality of telephones ($T_1$ to $T_n$) including mobile telephones, and at least one transmission station (UEV) for transmitting signals in said telephone communications apparatus (KV);

a test apparatus (TV) for testing said telephone communications apparatus (KV) in an operational load condition, wherein the telephones are connectable to the test apparatus, comprising:

a central signal processing apparatus (ZV) having
at least one programmable data processing apparatus (S) for the generation of digital test signals for testing said telephone communications apparatus (KV) under the control of test instructions; and a converter apparatus (WV) connected to said programmable data processing apparatus (S), wherein
said converter apparatus converts the digital test signals of the programmable data processing apparatus (S) under the control of telephone specific configuration data, which comprise data for adapting the converter apparatus (WV) to the telephone employed, into operating signals for controlling the operation of the keypad and of the microphone of the telephone ($T_n$); and said converter apparatus converts answer signals received from the loudspeaker and from the calling apparatus of the telephone ($T_n$) into digital operating answer signals and transfers them to the programmable data processing apparatus (S), where they are saved; and a connection apparatus (AV), by means of which the converter apparatus (WV) is connected with the telephone ($T_n$) and by means of which the operating signals from the converter apparatus (WV) are transmitted to the telephone ($T_n$) and answer signals are transmitted from the telephone ($T_n$) to the converter apparatus (WV).

2. A communications system according to claim 1, wherein said connection apparatus comprises:

an adapter on said telephone connected to the telephone's keypad, microphone, loudspeaker and call apparatus; and a detachable connection line provided between said adapter on said telephone and said converter apparatus.

3. A communications system according to claim 1, wherein said programmable data processing apparatus (S) is connected via a remote data transmission apparatus (DFV) to a plurality of external programmable data processing apparatuses ($C_1$–$C_n$) and data display apparatuses.

4. A communications system according to claim 3, wherein a local network (LAN) is provided for remote data transmission.

5. A communications system according to claim 3, wherein an internet is provided for remote data transmission.

6. A communications system according to claim 1, wherein said transmission station (UEV) is a GSM transmission station comprising a mobile service switching center (MSC), a base switching center (BSC) and a base transceiver station (BTS).

7. A communications system according to claim 1, further comprising an interrupt apparatus which comprises:

a digital control circuit (DS) with a memory apparatus for the saving of telephone-specific and transmission station specific configuration data for adapting the converter apparatus to various telephones and transmission stations; and a converter circuit (AS) in order to convert the digital test signals from the digital control circuit (DS) into operating signals for operating the telephones ($T_n$) or the transmission stations (UEV) and in order to convert the answer signals from the telephones ($T_n$) into digital operating answer signals.

8. A communications system, comprising:

a telephone communications apparatus that contains a plurality of telephones ($T_1$ to $T_n$) including mobile telephones, and at least one transmission station (UEV) for transmitting signals in said telephone communications apparatus (KV);

a test apparatus (TV) for testing said telephone communications apparatus (KV) in an operational load condition, wherein the telephones are connectable to the test apparatus, comprising:

a central signal processing apparatus (ZV) having
at least one programmable data processing apparatus (S) for the generation of digital test signals for testing said telephone communications apparatus (KV) under the control of test instructions; and a converter apparatus (WV) connected to said programmable data processing apparatus (S), wherein
said converter apparatus converts the digital test signals of the programmable data processing apparatus (S) under the control of telephone specific configuration data, which comprise data for adapting the converter apparatus (WV) to the telephone employed, into operating signals for controlling the operation of the keypad and of the microphone of the telephone ($T_n$); and said converter apparatus converts answer signals received from the loudspeaker and from the calling apparatus of the telephone ($T_n$) into digital operating answer signals and transfers them to the programmable data processing apparatus (S), where they are saved;

a connection apparatus (AV), by means of which the converter apparatus (WV) is connected with the telephone ($T_n$) and by means of which the operating signals from the converter apparatus (WV) are transmitted to the telephone ($T_n$) and answer signals are transmitted from the telephone ($T_n$) to the converter apparatus (WV);

at least one interrupt apparatus (UV) is provided for interrupting a plurality of electrical connection lines of the telephone communications apparatus (KV);

the converter apparatus (WV) controls the at least one interrupt apparatus (UV) by means of further digital test signals from the programmable data processing apparatus (S); and according to operating signals from the converter apparatus (WV) the interrupt apparatus (UW) interrupts at least one of the electrical connection lines for a period of time determined by the operating signals, wherein signal changes are produced depending on the systematic interruptions in the telephone communications apparatus (KV), which can be indicated by comparison with the corresponding reference signal changes.

9. A communications system according to claim 8, wherein individual or groups of electrical connection lines arranged within at least said one transmission station (UEV) or between different transmission stations (UEV) can be interrupted by said interrupt apparatus (UV).

10. A communications system according to claim 8, wherein response signals obtained from said transmission station (UEV) can be converted into digital operating response signals by said converter apparatus (WV).

11. A communications system according to claim 8, wherein said at least one interrupt apparatus (UV) is arranged between contact strips (KL1) of at least one circuit card (SK) and contact strips (KL2) of a circuit card carrier (ST) of said transmission station (UEV).

12. A communications system according to claim 11, wherein a plurality of circuit cards is connected together in series and each comprises its own address, and that said circuit cards can be controlled via a single control line.

13. A communications system according to claim 8, wherein said at least one interrupt apparatus (UV) is arranged on the respective front end of said circuit cards (SK) of said transmission station (UEV) connected to a circuit card carrier (ST).

14. A communications system according to claim 8, wherein said connection apparatus comprises:
    an adapter on said telephone connected to the telephone's keypad, microphone, loudspeaker and call apparatus; and
    a detachable connection line provided between said adapter on said telephone and said converter apparatus.

15. A communications system according to claim 8, wherein said programmable data processing apparatus (S) is connected via a remote data transmission apparatus (DFV) to a plurality of external programmable data processing apparatuses ($C_1$–$C_n$) and data display apparatuses.

16. A communications system according to claim 15, wherein a local network (LAN) is provided for remote data transmission.

17. A communications system according to claim 15, wherein an internet is provided for remote data transmission.

18. A communications system according to claim 8, wherein said transmission station (UEV) is a GSM transmission station comprising a mobile service switching center (MSC), a base switching center (BSC) and a base transceiver station (BTS).

19. A communications system according to claim 8, wherein the interrupt apparatus comprises:
    a digital control circuit (DS) with a memory apparatus for the saving of telephone-specific and transmission station specific configuration data for adapting the converter apparatus to various telephones and transmission stations; and
    a converter circuit (AS) in order to convert the digital test signals from the digital control circuit (DS) into operating signals for operating the telephones ($T_n$) or the transmission stations (UEV) and in order to convert the answer signals from the telephones ($T_n$) into digital operating answer signals.

20. A method of testing, under operational load conditions, a telephone communications apparatus (KV) which contains a plurality of telephones ($T_1$ to $T_n$) including mobile telephones, and at least one transmission station (UEV) for transmitting signals in said telephone communications apparatus (KV), comprising:
    generating digital test signals in a programmable data processing apparatus (S) of a central signal processing apparatus (ZV) controlled by means of test instructions for testing the telephone communications apparatus (KV);
    transmitting the digital test signals to a converter apparatus (WV) of the central signal processing apparatus and converting the digital test signals, by use of telephone-specific configuration data, into operating signals for the operational control of the keypad and microphone of the telephone ($T_n$); and
    converting answer signals received from the loudspeaker and from the calling apparatus of the telephone into digital operating answer signals and transferring the digital operating answer signals to the programmable data processing apparatus (S) and recording the operating answer signals.

21. A method of testing a telephone communications apparatus according to claims 20, with the steps of:
    transmitting operating signals from said converter apparatus (WV) to telephone selected according to said test commands via a connection apparatus; and
    transmitting response signals of dialed telephone to said converter apparatus via said connection apparatus.

22. A method of testing a telephone communications apparatus according to claim 20, wherein data are transmitted via a remote data transmission apparatus (DFV) between said programmable data processing apparatus (S) of test apparatus (TV) and a plurality of external programmable data processing apparatuses ($C_1$–$C_n$) and data display apparatuses.

23. A method of testing, under operational load conditions, a telephone communications apparatus (KV) which contains a plurality of telephones ($T_1$ to $T_n$) including mobile telephones, and at least one transmission station (UEV) for transmitting signals in said telephone communications apparatus (KV), comprising:
    generating digital test signals in a programmable data processing apparatus (S) of a central signal processing apparatus (ZV) controlled by means of test instructions for testing the telephone communications apparatus (KV);
    transmitting the digital test signals to a converter apparatus (WV) of the central signal processing apparatus and converting the digital test signals, by use of telephone-specific configuration data, into operating signals for the operational control of the keypad and microphone of the telephone ($T_n$); and
    converting answer signals received from the loudspeaker and from the calling apparatus of the telephone into digital operating answer signals and transferring the digital operating answer signals to the programmable data processing apparatus (S) and recording the operating answer signals;
    interrupting at least an electrical connection of a plurality of electrical connections of the communications apparatus (KV) by an interrupt apparatus (UV) under the control of further systematic test signals;
    comparing the actual signal changes produced on the basis of the systematic interruptions with the corresponding reference signal changes; and
    indicating deviations of the actual signal changes from the reference signal changes.

24. A method of testing, under operational load conditions, a telephone communications apparatus (KV) which contains a plurality of telephones ($T_1$ to $T_n$) including mobile telephones, and at least one transmission station (UEV) for transmitting signals in said telephone communications apparatus (KV), comprising:
    generating digital test signals in a programmable data processing apparatus (S) of a central signal processing apparatus (ZV) controlled by means of test instructions for testing the telephone communications apparatus (KV);

transmitting the digital test signals to a converter apparatus (WV) of the central signal processing apparatus and converting the digital test signals, by use of telephone-specific configuration data, into operating signals for the operational control of the keypad and microphone of the telephone ($T_n$); and converting answer signals received from the loudspeaker and from the calling apparatus of the telephone into digital operating answer signals and transferring the digital operating answer signals to the programmable data processing apparatus (S) and recording the operating answer signals;

setting up a voice channel between each pair of telephones of a plurality of telephones ($T_1$ to $T_n$) in a call involving two parties or a conference call involving three or more participants;

on the basis of the first telephone, repeatedly transmitting with a predetermined frequency via said voice channel a pattern of tone pulses that clearly identifies said first telephone; and having a second telephone participating in the call monitor the reception of said first telephone's pattern of tone pulses transmitted via said voice channel;

wherein the transmission of said pattern of tone pulses between said first and second telephones includes voice compression and voice decompression; and said pattern of tone pulses being selected such that an identification of said first telephone is possible when said pattern of tone pulses is received at said second telephone if voice compression and voice decompression are used.

* * * * *